(12) United States Patent
Al-Beik et al.

(10) Patent No.: US 8,271,416 B2
(45) Date of Patent: Sep. 18, 2012

(54) METHOD FOR DYNAMICALLY DETERMINING A PREDETERMINED PREVIOUS CONDITION OF A RULE-BASED SYSTEM

(75) Inventors: Haitham Mahmoud Al-Beik, Stow, MA (US); Bjorn Bergsten, Southborough, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 662 days.

(21) Appl. No.: 12/189,843

(22) Filed: Aug. 12, 2008

(65) Prior Publication Data

US 2010/0042572 A1 Feb. 18, 2010

(51) Int. Cl.
*G06F 17/00* (2006.01)
(52) U.S. Cl. ........................................................ 706/47
(58) Field of Classification Search .................. 707/694
See application file for complete search history.

(56) References Cited

U.S. PATENT DOCUMENTS

| | | | |
|---|---|---|---|
| 4,837,735 A | 6/1989 | Allen, Jr. et al. | |
| 4,849,905 A | 7/1989 | Loeb et al. | |
| 4,890,240 A | 12/1989 | Loeb et al. | |
| 4,953,147 A | 8/1990 | Cobb | |
| 5,123,017 A * | 6/1992 | Simpkins et al. | 714/26 |
| 5,129,043 A | 7/1992 | Yue | |
| 5,150,308 A | 9/1992 | Hooper et al. | |
| 5,161,158 A * | 11/1992 | Chakravarty et al. | 714/26 |
| 5,175,696 A | 12/1992 | Hooper et al. | |
| 5,197,116 A | 3/1993 | Katoh et al. | |
| 5,226,110 A | 7/1993 | Schwuttke et al. | |
| 5,241,652 A | 8/1993 | Barabash et al. | |
| 5,263,127 A | 11/1993 | Barabash et al. | |
| 5,303,332 A | 4/1994 | Kirk et al. | |
| 5,331,579 A | 7/1994 | Maguire, Jr. et al. | |
| 5,485,616 A | 1/1996 | Burke et al. | |
| 5,566,092 A * | 10/1996 | Wang et al. | 702/185 |
| 5,664,093 A * | 9/1997 | Barnett et al. | 714/31 |
| 5,706,452 A | 1/1998 | Ivanov | |
| 5,720,009 A | 2/1998 | Kirk et al. | |
| 5,737,739 A * | 4/1998 | Shirley et al. | 715/207 |
| 5,802,508 A | 9/1998 | Morganstern | |
| 5,890,130 A | 3/1999 | Cox et al. | |
| 5,920,861 A | 7/1999 | Hall et al. | |
| 5,960,404 A | 9/1999 | Chaar et al. | |
| 6,009,405 A | 12/1999 | Leymann et al. | |
| 6,401,111 B1 | 6/2002 | Dan et al. | |
| 6,473,748 B1 | 10/2002 | Archer | |
| 6,631,271 B1 | 10/2003 | Logan | |
| 6,662,172 B1 | 12/2003 | Smith | |
| 6,697,791 B2 | 2/2004 | Hellerstein et al. | |
| 6,789,054 B1 | 9/2004 | Makhlouf | |
| 6,807,583 B2 | 10/2004 | Hrischuk et al. | |
| 6,952,690 B2 | 10/2005 | Lumpp et al. | |
| 6,993,514 B2 | 1/2006 | Majoor | |
| 7,051,339 B2 | 5/2006 | Deverill et al. | |

(Continued)

*Primary Examiner* — Jeffrey A Gaffin
*Assistant Examiner* — Paulinho E Smith
(74) *Attorney, Agent, or Firm* — K&L Gates LLP

(57) ABSTRACT

A method for dynamically determining a predetermined previous condition of a rule-based system comprising a plurality of rules. Each of the plurality of rules is associated with a transaction and a condition under which the transaction is executed. In one embodiment, the method includes the steps of (a) determining a system condition; (b) determining an immediate previous condition that caused the system condition; (c) setting the immediate previous condition to the system condition; and (d) repeating steps (b) and (c) until the predetermined previous condition is reached.

18 Claims, 1 Drawing Sheet

U.S. PATENT DOCUMENTS

| | | |
|---|---|---|
| 7,058,826 B2 | 6/2006 | Fung |
| 7,120,559 B1 | 10/2006 | Williams et al. |
| 7,165,105 B2 | 1/2007 | Reiner et al. |
| 7,203,746 B1 | 4/2007 | Harrop |
| 7,203,881 B1 | 4/2007 | Williams et al. |
| 7,222,302 B2 | 5/2007 | Hauser et al. |
| 7,428,519 B2 | 9/2008 | Minsky et al. |
| 7,433,858 B2 * | 10/2008 | Rehberg et al. ............ 706/47 |
| 7,720,639 B2 * | 5/2010 | Kirchner et al. ............ 702/183 |
| 2003/0070114 A1 * | 4/2003 | Yasuda ............ 714/20 |
| 2004/0073843 A1 * | 4/2004 | Dean et al. ............ 714/37 |
| 2004/0199573 A1 * | 10/2004 | Schwartz et al. ............ 709/201 |
| 2004/0225927 A1 * | 11/2004 | Warpenburg et al. ............ 714/47 |
| 2005/0038764 A1 | 2/2005 | Minsky et al. |

\* cited by examiner

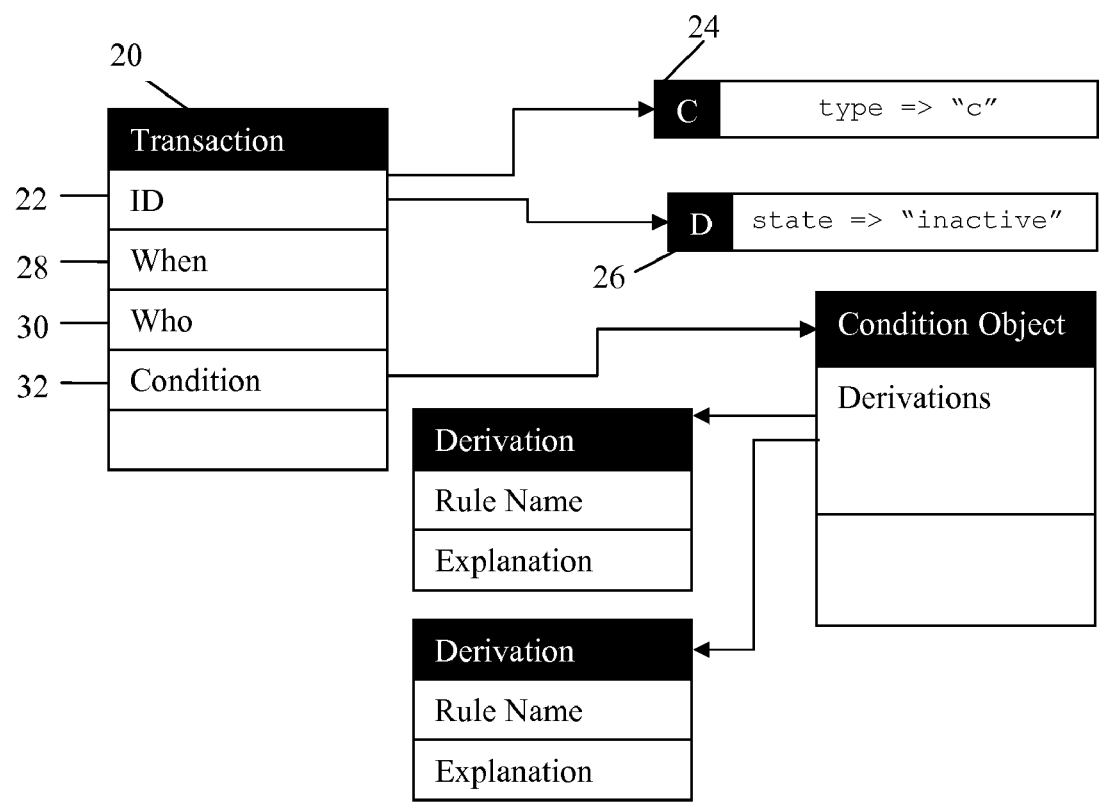

METHOD FOR DYNAMICALLY DETERMINING A PREDETERMINED PREVIOUS CONDITION OF A RULE-BASED SYSTEM

FIELD OF THE INVENTION

The invention relates generally to the field of computer science and more specifically to the field of computer event logging.

BACKGROUND OF THE INVENTION

Event logs on computers serve the purpose of telling the computer operator what the state of the system was just before an event occurred. In this way, the computer operator can determine what caused an event, such as a malfunction, to occur and thereby aid in correcting the problem and preventing it from happening again. Typically, event logs require a good deal of storage to hold the event data and the results are generally difficult to interpret.

The present invention addresses these issues.

SUMMARY OF THE INVENTION

In one aspect, the invention relates to a method for dynamically determining a predetermined previous condition in a rule-based system comprising a plurality of rules. Each of the plurality of rules is associated with a transaction and a condition under which the transaction is executed. In one embodiment, the method includes the steps of (a) determining a system condition; (b) determining an immediate previous condition that caused the system condition; (c) setting the immediate previous condition to the system condition; and (d) repeating steps (b) and (c) until the predetermined previous condition is reached.

In one embodiment, the step of determining an immediate previous condition includes the step of determining a rule associated with the immediate previous condition wherein the execution of the rule causes the system condition. In another embodiment, the rule includes a data structure comprising an explanation describing the reason for executing the rule. In yet another embodiment, the transaction includes indicia as to the initiator of the transaction, wherein the indicia is selected from one of a user, a system component and a policy condition, and wherein the predetermined previous condition is reached when the indicia is a user or a system component. In another embodiment, the transaction further includes a unique transaction identifier identifying the transaction; a description of the transaction; a timestamp indicating the time of the transaction; and an explanation explaining why the transaction was executed. In another embodiment, the immediate previous condition is associated with at least one derivation, each derivation comprising a rule and an explanation for executing the rule.

In another aspect, the invention relates to the method of deriving a cause of a given state of a rule-based system comprising a plurality of rules, each rule comprising a transaction and a condition. In one embodiment, the method includes the steps of (a) determining a transaction resulting in the given state; (b) determining a condition under which the transaction executes; (c) determining which rule of the plurality of rules was executed by the condition; and (d) determining an explanation associated with the transaction.

In yet another aspect, the invention relates to a method of inspecting a rule-based system in a given state, the rule-based system comprising a plurality of rules, each rule including a transaction, each transaction initiated by a corresponding condition, each condition containing at least one derivation and an explanation associated with the rule. In one embodiment, the method includes for each transaction in the series of rule executions, (a) determining the condition executing the transaction; (b) determining the derivation identifying the rule triggering the transaction; (c) determining the explanation associated with the rule, thereby generating the cause of the given state by combining the explanation for each of the executed rules.

In still yet another aspect, the invention relates to an apparatus for dynamically determining a predetermined previous condition of a rule-based system including a plurality of rules, each of the plurality of rules is associated with a transaction and a condition under which the transaction is executed. In one embodiment, the apparatus includes a first condition determining module adapted to determine a given system condition of the rule-based system; a second condition determining module adapted to determine an immediate previous condition that caused the given system condition, the second condition determining module in communication with the first condition determining module; and a condition setting module adapted to set the immediate previous condition to the given system condition, the condition setting module in communication with both the first condition determining module and the second condition determining module. The condition setting module iteratively sets the immediate previous condition of a given system condition to the given system condition until the predetermined previous condition is reached.

In another embodiment, the first condition determining module is the second condition determining module. In yet another embodiment, the second condition determining module determines an immediate previous condition by determining a rule associated with the immediate previous condition, wherein the execution of the rule causes the given system condition. In still yet another embodiment, the rule includes a data structure comprising an explanation describing the reason for executing the rule. In yet another embodiment, the transaction includes indicia as to the initiator of the transaction, wherein the indicia is selected from one of a user, a system component and a policy condition, and wherein the predetermined previous condition is reached when the indicia is a user or a system component. In still yet another embodiment, the transaction further includes a unique transaction identifier identifying the transaction; a description of the transaction; a timestamp indicating the time of the transaction; and an explanation explaining why the transaction was executed. In still yet another embodiment, the immediate previous condition is associated with at least one derivation, each derivation comprising a rule and an explanation for executing the rule.

In yet another aspect, the invention relates to an apparatus for deriving a cause of a given state of a rule-based system. The apparatus includes a plurality of rules, each rule including a transaction and a condition. In one embodiment, the apparatus includes a transaction determining module adapted to determine a transaction resulting in the given state; a condition determining module adapted to determine a condition under which the transaction executes, the condition determining module in communication with the transaction determining module; a rule determining module adapted to determine which rule of the plurality of rules was executed by the condition, the rule determining module in communication with the condition determination module; and an explanation determining module adapted to determine an explanation associated with the transaction, the explanation determining module in communication with the rule determining module.

In another aspect, the invention relates to an apparatus for inspecting a previous state of a rule-based system, the rule-based system including a plurality of rules, each rule comprising a transaction, each transaction initiated by a corresponding condition, each condition containing at least one derivation and an explanation associated with the rule. In one embodiment, the apparatus includes: a rule execution module adapted to execute transactions in a series of rules, condition determining module adapted to determine each of the conditions causing the corresponding transactions, the condition determining module in communication with the rule execution module; a derivation determining module adapted to determine each of the derivations that identifies the corresponding rule, the derivation determining module in communication with the condition determining module; an explanation determining module adapted to determine each of the explanations associated with each of the rules, the explanation determining module in communication with the derivation determining module, a cause generating module adapted to generate the cause of the given state by combining the explanation for each of the executed rules, the cause generating module in communication with the explanation determining module.

Another aspect of the invention relates to an apparatus for dynamically determining a predetermined previous condition of a rule-based system including a plurality of rules, each of the plurality of rules is associated with a transaction and a condition under which the transaction is executed. In one embodiment, the apparatus includes a processor adapted to perform the steps of: (a) determining a system condition; (b) determining an immediate previous condition that caused the system condition; (c) setting the immediate previous condition to the system condition; and (d) repeating steps (b) and (c) until the predetermined previous condition is reached.

DESCRIPTION OF THE DRAWINGS

The invention is pointed out with particularity in the appended claims. The advantages of the invention described above, together with further advantages, may be better understood by referring to the following description taken in conjunction with the accompanying drawings. In the drawings, like reference characters generally refer to the same parts throughout the different views. The drawings are not necessarily to scale, emphasis instead generally being placed upon illustrating the principles of the invention.

FIG. 1 is a diagram of an embodiment of a data structure of the invention.

DESCRIPTION OF THE PREFERRED EMBODIMENT

This invention, in one embodiment, relies on the fact that the underlying system is a rule based system. A rule-based system includes a series of rules which includes a condition and a transaction. When a condition becomes true, the condition of the rule triggers the transaction of the rule. That is, the existence of a predefined condition causes a predefined transaction or action. By keeping track of what previous rule caused an action that caused a subsequent rule to trigger, one can work backwards from a given event and determine what series of steps caused that event to occur.

For example, a rule could be:
  IF A="1" THEN SET B="2"

Under this rule, when A becomes "1" then B is automatically set to "2." So, given this rule and the fact that "B=2," one can infer that "A" was set equal to "1."

Rules can include multiple conditions and multiple actions. For example, assume the following is a condition for a rule to trigger:
  IF (A.type="a" AND B.state="active")

In this rule "A" and "B" are objects, and "type" and "state" are properties of A and B respectively. Thus, when the type of object A is "a" and the state of object B is "active," the condition on the left hand side of the rule is satisfied. When such a condition becomes satisfied, the following transaction (with two actions) occurs:
  THEN (C.type="c" AND D.state="inactive")

That is, in one action of the transaction C will be set to type "c" and in the other action of the transaction the state of D will be set to "inactive." These two actions make up the transaction of this rule.

In one embodiment of the system, each transaction is represented by an object. Referring to FIG. 1, each transaction object 20 includes the following properties:
  an "ID property" 22 that points to the objects 24, 26 (in this case C and D respectively) updated by the transaction;
  a "when property" 28 that indicates when the transaction occurred;
  a "who property" 30 determines who caused the transaction property to be updated; and
  a "condition property" 32 points to the rules which caused the condition to be triggered.

In more detail, the "who property" 30 make take on one of three values:
  User: The property was updated by a user request;
  System: The property was updated by a system request;
  Policy Rule: The property was updated due to a policy rule Similarly, the "condition property" 32 contains derivations based on the rules that triggered the condition. A "condition property" can depend from multiple rules. Consider for example, the case where there are three possible rules with left hand side conditions:
  Rule 1: IF (a=1 and b=2)
  Rule 2: IF (a=1)
  Rule 3: IF (b=3)
Which lead to the right hand side action:
  THEN (c=3)

In this case, if "a=1" and the condition is triggered, then two derivations are generated indicating that C is equal to 3 due to both Rule 1 and Rule 2 being true. The "condition property" points to the derivations (in this example "Rule 1" and "Rule 2") which include rule names and explanation. Each explanation includes a list of property IDs and values. That is: {PID: Value, PID: Value, . . . }. Thus, in this case the Rule 1 entry would have the PID for "a" and the value "1" and a PID for "b" and the value "2." The Rule 2 entry would have only the PID for "a" and the value "1." A string of derivations can then be formed because each property has a pointer to the transaction object that resulted in the current state. One can then extract the PID of one of the properties that was derived and use the transaction ID to navigate to the next previous transaction object from which more explanations can be extracted. This moving to the next transaction can continue until the "who property" of a transaction object is something other than a "Policy Rule." This means that the backtracking stops when the property has either been updated due to a user request or a because of system component (e.g. temperature sensor) has changed to some predefined value.

In more detail, one embodiment of the data structures of the various objects are herein disclosed.

Structure of the Transaction Object:
```
<object name="Transaction">
    <description>Includes information about why and when this transaction was executed</description>
    <ptype name="Tid" kind="key" link="KeyTransaction" value="integer" >
        <description>A unique Transaction Identifier.</description>
    </ptype>
    <ptype name="RefCounter" value="integer">
        <description>Number of properties that reference this Transaction object.</description>
    </ptype>
    <ptype name="Description" value="string">
        <description>Description of the Transaction.</description>
    </ptype>
    <ptype name="Timestamp" value="integer">
        <description>When the transaction was executed.</description>
    </ptype>
    <ptype name="Explanation" value="string">
        <description>A string explaining why this transaction was initiated (only for conditions).</description>
    </ptype>
    <ptype name="Initiator" value="string">
        <description>A string identifying the initiator. Can be a user name, a system component or a condition name.</description>
    </ptype>
    <ptype name="InitiatorType" value="string">
        <description>Type of the Initiator. Can be SYS, USR or COND.</description>
    </ptype>
    <ptype name="ConditionKeyString" value="string">
        <description>If the Initiator is a Condition, this string identifies the Condition instance within the Condition.</description>
    </ptype>
    <property name="Tid" />
    <property name="RefCounter" />
    <property name="Description" />
    <property name="Timestamp" />
    <property name="Initiator" />
    <property name="InitiatorType" />
    <property name="ConditionKeyString" card="zeromore" />
    <property name="Explanation" card="zeroone" />
</object>
```
Structure of the Condition Object:
```
<object name="Condition">
    <description>Includes information about the triggered condition</description>
    <ptype name="condKey" kind="key" link="KeyTransaction" value="integer" >
        <description>A unique condition Identifier.</description>
    </ptype>
    <ptype name="condName" value="string">
        <description>The name of the condition.</description>
    </ptype>
    <ptype name="parameters" value="list">
        <description>List of values for the condition parameters.</description>
    </ptype>
    <ptype name="derivations" value="list">
        <description>List of derivations.</description>
    </ptype>
    <property name="condKey" />
    <property name="condName" card="zeroone" />
    <property name="parameters" />
    <property name="derivations" />
</object>
```
Structure of the Derivation Object:
```
<object name="derivation">
    <description>Includes information about the derivation from a condition</description>
    <ptype name="derivationKey" kind="key" link="condKey" value="integer" >
        <description>A unique derivation Identifier.</description>
    </ptype>
    <ptype name="ruleName" value="string">
        <description>The name of the rule that was triggered.</description>
    </ptype>
    <ptype name="pidValues" value="list">
        <description>List of property ids and their respective values.</description>
    </ptype>
```

-continued

```
    <property name="derivationKey" />
        <property name="ruleName" />
    <property name="pidValues" />
</object>
```

The linked data structures permit user to back track from an event to the causes of the event. For example, assume that a user wants to know why "c" is in its current state. The system allows the user to select "c," and then provides a set of derivations each listing the rule names and the values which ultimately cause the current condition "c" to occur. Each of these explanations can then be converted into any natural language of the user's choosing, to provide an easy to understand explanation of the series of events that lead to "c" being its current value.

Consider a more complex example wherein a user requests a shutdown of one of two computers interconnected to each other in a single system. Before the software shuts down the computer, the system needs to move any outstanding/current operations to the other interconnected computer which will continue to run the application. After all the operations are migrated to the remaining computer, then the first computer can be shut down. A simplified view of what information will be populated in such a table is:

| ID | Property Changed To: | Function/rule | Parent ID |
|---|---|---|---|
| 0 | ShutdownRequest (false-> true) | User Request | null |
| 1 | Operating On (1 -> 2) | changeOperation | 0 |

At any point in time the user can ask why the operating system is running on computer (2). The property that holds that information is "OperatingOn"; that is, what computer is the system operating on. The function or rule that caused the system to be operating on computer 2 was changeOperation from (1) to (2) on the date/time stored with the property. The function changeOperation can then be translated into a natural language equivalent in layman terms in any language.

If the user then asks why the operation was changed, the first check will be to determine if that property has a parent ID. In this case the parent ID is "0" and the property with ID 0 investigated. ID 0 property indicates there was a shutdown requested by a user on date/time. The user can continue to ask why there was a shutdown requested. The shutdown property indicates it was due to a user request on the specified date/time. Because the parent ID is a null, there is no further backtracking possible. Note that the user can query any parameter in the flow without having to start from the beginning and still reach the same conclusions. It is worth noting that a single operation can point back to multiple parent IDs.

Although a rule-based system is one type of platform under which the invention can be implemented, it is not the only type of system that can be used. In one embodiment, a standard non-rule-driven relational based database is used to develop such a log system. Today, relational databases are more prevalent compared to rule-driven parallel systems. A key difference is how the information is stored so as to take advantage of the explanation techniques. Specifically every update must be tracked and meta-data entered as to why the update was performed. That is, a mechanism is needed to generate the appropriate explanation for each update at any point in time. An update, in addition, can cause multiple updates with multiple explanations. This update data can be stored in an updates table. The updates table also points to a Transaction ID which provides information as to why the update occurred and what transaction is responsible for the update. Thus, although not as directly implemented as in a rule-based system, a relational database implementation of the invention is possible.

An example of how the current invention compares to traditional log files is now considered. Assume there is a rule that states if a=1 and b=2, then c=3. Also assume that the following events have occurred:

On Oct. 23, 2007 at 10:33 am "a" was set to 1.
On Oct. 29, 2007 at 4:22 am "b" was set to 2.
Immediately afterwards: "c" was set to "3."

A user attempting to use "log" files to analyze all the variable changes and determine why c is set to "3" would need to review 6 days of log files (between the setting of "c" on Oct. 29, 2007 and the setting of "a" on Oct. 23, 2007. However, with the present invention however, the change in "c" may be determined simply by querying why the state of "c" is "3." Note that if "a" and "b" were computed variables based on other variables and so on, there might be multiple levels of computations before "a" became "1" or "b" became "2."

It is important to remember that unlike conventional log files, the fact that "c" became "3" on Oct. 29, 2007 when "b" became "2" after "a" became "1" on Oct. 23, 2007 was not known prior to the query. It was simply generated from the rules once the query "Why is "C" set to "3" is asked.

EXAMPLE

Consider the following example in which multiple rules are triggered. Assume that two nodes (Nodes N1 and N2) are connected together making a single processing system referred to as the Unit. A virtual machine is created as part of the single processing system running on Node N1. At some time, (for example day 6) the virtual machine on Node N1 is determined to be not running and the operator wants to know why. Assume that the following five rules exist:
Available Rules:
Rule 1:
  if a sensor on a node becomes critical
  then node is predicted to fail
Rule 2:
  if a disk on a node fails
  then node is predicated to fail
Rule 3:
  if a single node is predicted to fail
  then migrate any virtual machines on that node to the other
Rule 4:
  if both nodes are predicted to fail
  then the Unit is predicted to fail
Rule 5:
  if a virtual machine is running and the Unit is predicted to fail
  then shutdown the virtual machine
Let us assume the following timeline and resulting rules being fired:

Day 1: A disk fails on Node N1 causing RULE 2 to trigger and Node N1 is flagged as "Predicted to Fail". As a result RULE 3 triggers and the virtual machine migrates from Node N1 to Node N2.

Day 5: Node N2 has a temperature sensor that registers a critical temperature value and RULE 1 to trigger and Node N2 is flagged as "Predicted to Fail". As a result RULE 4 triggers causing RULE 5 to trigger. As a result of RULE 5 triggering the virtual machine now on Node N2 is shutdown.

Day 6: At this point an operator notices that the virtual machine is not running and queries the system: "Why is the Virtual Machine State Shutdown?"

The system then replies: "Based on Rule 5: The Unit was predicted to fail"

The operator can keep interrogating the system: "Why?"

The system replies: "Based on Rule 4: Both Nodes were predicted to fail"

Again the operator asks "Why?"

The system then replies: "Based on Rule 1: N2 had a critical temperature sensor value. Based on Rule 2: N1 had a disk fail"

Therefore, the operator knows that the disk on N1 failed or was about to fail and that Node N2 had a critical temperature value and was about to fail. Because both nodes of the Unit failed or were about to fail, the virtual machine was shutdown. Thus, a query can be made and the explanations provided to the operator. Note that in this case, this method of tracing through the rules tree avoids having the user dig deeply into log files that span ~4 days. Since 4 days of log files contain huge amount of many other unrelated data that the operator does not need, the system equivalently filters the unnecessary material out.

While the present invention has been described in terms of certain exemplary preferred embodiments, it will be readily understood and appreciated by one of ordinary skill in the art that it is not so limited, and that many additions, deletions and modifications to the preferred embodiments may be made within the scope of the invention as hereinafter claimed. Accordingly, the scope of the invention is limited only by the scope of the appended claims.

What is claimed is:

1. A method for dynamically determining a predetermined previous condition of a computer system having a rule-based system comprising a plurality of rules, each rule of the plurality of rules is associated with a transaction and a condition, when the condition is triggered the transaction is executed, the method comprising the steps of:
   (a) representing each transaction by a transaction object using the computer system, each transaction object having a data structure and comprising a transaction identifier, a who property, a when property and a condition property, wherein each condition property points to one or more rules of the plurality of rules which caused the condition to be triggered;
   (b) representing, using the computer system, each condition by a condition object;
   (c) determining, by the computer system, a current computer system condition, the current computer system condition based on the expression of one or more rules of the plurality of rules;
   (d) determining, by the computer system, an immediate previous condition that caused the current computer system condition;
   (e) backtracking by the computer system using one or more of the transaction identifiers to the immediate previous condition from the current computer system condition and setting the immediate previous condition as the current computer system condition; and
   (f) repeating steps (d) and (e) until the predetermined previous condition is reached.

2. The method of claim 1 wherein each condition object comprises a derivations property, the step of determining an immediate previous condition comprising the step of determining one or more rules associated with the immediate previous condition using a string of derivations, each derivation having a rule name and an explanation, wherein the execution of the rule causes the computer system condition.

3. The method of claim 1 wherein the data structure of each transaction object is linked to a data structure for a condition object and a data structure for a derivation object, the data structure of the transaction object comprising an explanation describing the reason for executing the transaction, wherein the step of backtracking is performed using links between one of the transaction objects and one of the condition objects and one of the derivation objects.

4. The method of claim 1 wherein the who property is selected from one of a user, a system component and a policy condition, and wherein the predetermined previous condition is reached when the who property is a user or a system component.

5. The method of claim 4 wherein the transaction further comprises:
   a description of the transaction; and;
   an explanation explaining why the transaction was executed, wherein the when property comprises a timestamp indicating the time of the transaction, wherein the explanation comprises one or more property identifiers and a value; and wherein the method further comprises the step of forming a string of derivations using one or more property identifiers.

6. The method of claim 1 wherein each condition object comprises a derivations property, the immediate previous condition is associated with at least one derivation, and each derivation comprising a rule and an explanation for executing the rule, wherein the explanation comprises a property identifier and a value and wherein the method further comprises the step of translating the explanation into a natural language equivalent.

7. A method of deriving a cause of a given state of a rule-based system comprising a plurality of rules, each rule comprising a transaction and a condition, the method comprising the steps of:
   (a) representing each transaction by a transaction object using the computer system, each transaction object comprising a when property and a computer system condition property, each computer system condition property pointing to one or more rules of the plurality of rules which caused the condition to be triggered;
   (b) determining a transaction resulting in the given state;
   (c) determining a condition under which the transaction executes;
   (d) determining which rule of the plurality of rules was executed by the condition; and
   (e) determining an explanation associated with the transaction;
   (f) translating the explanation into a natural language equivalent; and
   (g) displaying the natural language equivalent in response to a query.

8. A method of inspecting a computer system having a rule-based system in a given state to identify one or more causes of the given state over a multi-day time period, the computer system comprising a plurality of log files, the rule-based system comprising a plurality of rules, each rule comprising a transaction, each transaction initiated by a corresponding condition, each condition containing at least one derivation determined by a rule, and an explanation associated with the rule, the method comprising:

for each transaction in the series of rule executions,
   a) determining by the computer system the condition executing the transaction;
   b) determining by the computer system the derivation identifying the rule triggering the transaction;
   c) determining by the computer system, the explanation associated with the rule, thereby generating the cause of the given state by combining the explanation for each of the executed rules, wherein the cause occurs a day or more before the explanation is determined.

9. An apparatus for dynamically determining a predetermined previous condition of a rule-based system comprising a plurality of rules, each of the plurality of rules is associated with a transaction and a condition under which the transaction is executed, the apparatus comprising:

a processor, the processor executing:
   a first condition determining module adapted to determine a given system condition of the rule-based system, the system condition being generated by a rule;
   a second condition determining module adapted to determine an immediate previous condition that caused the given system condition, the second condition determining module in communication with the first condition determining module; and
   a condition setting module adapted to set the immediate previous condition to the given system condition, the condition setting module in communication with both the first condition determining module and the second condition determining module,
wherein the condition setting module iteratively backtracks along linked data structures from the given system condition to the immediate previous condition until the predetermined previous condition is reached.

10. The apparatus of claim 9 wherein the plurality of rules relate to a processing system comprising two connected nodes, the processing system comprising a plurality of log files spanning a plurality of days, wherein the backtracking occurs without a user accessing the log files.

11. The apparatus of claim 10 wherein the second condition determining module determines an immediate previous condition by determining a rule associated with the immediate previous condition, wherein the execution of the rule causes the given system condition.

12. The apparatus of claim 11 wherein the rule comprises a data structure comprising an explanation describing the reason for executing the rule.

13. The apparatus of claim 10 wherein the transaction comprises indicia as to the initiator of the transaction, wherein the indicia is selected from one of a user, a system component and a policy condition, and wherein the predetermined previous condition is reached when the indicia is a user or a system component.

14. The apparatus of claim 13 wherein the transaction further comprises:
   a unique transaction identifier identifying the transaction;
   a description of the transaction;
   a timestamp indicating the time of the transaction; and
   an explanation explaining why the transaction was executed.

15. The apparatus of claim 10 wherein the immediate previous condition is associated with at least one derivation, each derivation comprising a rule and an explanation for executing the rule.

16. An apparatus for deriving a cause of a given state of a rule-based system comprising a plurality of rules, each rule comprising a transaction and a condition, the apparatus comprising:

a processor, the processor executing:
   a transaction determining module adapted to determine a transaction resulting in the given state, the given state being generated by a rule;
   a condition determining module adapted to determine a condition under which the transaction executes, the condition determining module in communication with the transaction determining module;
   a rule determining module adapted to determine which rule of the plurality of rules was executed by the condition, the rule determining module in communication with the condition determination module; and
   an explanation determining module adapted to determine an explanation associated with the transaction each explanation comprising a property identifier and a value, the explanation determining module configured to translate each explanation into a natural language equivalent, the explanation determining module in communication with the rule determining module, wherein the processor represents each transaction by a transaction object, each transaction object comprising a transaction identifier and a condition property, each condition property points to one or more rules of the plurality of rules which caused the condition to be triggered.

17. A apparatus for inspecting a previous state of a rule-based system, the rule-based system comprising a plurality of rules, each rule comprising a transaction, each transaction initiated by a corresponding condition, each condition containing at least one derivation and an explanation associated with the rule, the apparatus comprising:

a processor, the processor executing:
   a rule execution module adapted to execute transactions in a series of rules,
   a condition determining module adapted to determine each of the conditions causing the corresponding transactions, the condition determining module in communication with the rule execution module;
   a derivation determining module adapted to determine each of the derivations that identifies the corresponding rule, the derivation determining module in communication with the condition determining module;
   an explanation determining module adapted to determine each of the explanations associated with each of the rules, the explanation determining module in communication with the derivation determining module, each explanation comprising a property identifier and a value, the explanation determining module configured to translate each explanation into a natural language equivalent,
   a cause generating module adapted to generate the cause of the given state by combining the explanation for each of the executed rules, the cause generating module in communication with the explanation determining module.

18. An apparatus for dynamically determining a predetermined previous condition of a rule-based system comprising a plurality of rules, each rule of the plurality of rules is associated with a transaction and a condition, when the condition is triggered the transaction is executed, the apparatus comprising
a processor adapted to perform the steps of:
  (a) represent each transaction by a transaction object, each transaction object comprising a transaction identifier, a who property, a when property and a condition property, each condition property points to one or more rules of the plurality of rules which caused the condition to be triggered, each transaction object having a data structure;
  (b) represent each condition by a condition object;
  (c) determine a system condition caused by the execution of one or more rules of the plurality of rules;
  (d) determine an immediate previous condition that caused the system condition;
  (e) backtrack using one or more of the transaction identifiers to the immediate previous condition from the system condition; and
  (f) repeating steps (d) and (e) until the predetermined previous condition is reached.

* * * * *